(12) United States Patent
Kwon et al.

(10) Patent No.: US 12,463,990 B2
(45) Date of Patent: Nov. 4, 2025

(54) METHOD AND APPARATUS FOR VISUALIZING MEDICAL DEVICE NETWORK AND SECURITY ATTACK

(71) Applicant: ELECTRONICS AND TELECOMMUNICATIONS RESEARCH INSTITUTE, Daejeon (KR)

(72) Inventors: Hyeok-Chan Kwon, Daejeon (KR); Byung-Ho Chung, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 210 days.

(21) Appl. No.: 18/512,891

(22) Filed: Nov. 17, 2023

(65) Prior Publication Data

US 2024/0205242 A1 Jun. 20, 2024

(30) Foreign Application Priority Data

Dec. 14, 2022 (KR) .......................... 10-2022-0175015

(51) Int. Cl.
*H04L 9/40* (2022.01)
*H04L 41/22* (2022.01)
(52) U.S. Cl.
CPC .......... *H04L 63/1416* (2013.01); *H04L 41/22* (2013.01)
(58) Field of Classification Search
CPC .............................. H04L 41/22; H04L 63/1416
See application file for complete search history.

(56) References Cited

U.S. PATENT DOCUMENTS

| 7,539,147 | B2 | 5/2009 | Chang et al. |
| 9,130,981 | B2 | 9/2015 | Yi |
| 9,871,806 | B2 | 1/2018 | Sohn et al. |
| 10,374,904 | B2 * | 8/2019 | Dubey .................... G06F 3/048 |

(Continued)

FOREIGN PATENT DOCUMENTS

| KR | 10-0582555 B1 | 5/2006 |
| KR | 101160903 B1 | 6/2012 |

(Continued)

OTHER PUBLICATIONS

Taylor, Curtis R., Krishna Venkatasubramanian, and Craig A. Shue. "Understanding the security of interoperable medical devices using attack graphs." Proceedings of the 3rd international conference on High confidence networked systems. (Year: 2014).*

(Continued)

*Primary Examiner* — John M Macilwinen
(74) *Attorney, Agent, or Firm* — Rabin & Berdo, P.C.

(57) ABSTRACT

Disclosed herein is a method for visualizing a medical device network and a security threat. The method includes representing nodes in zones that are divided into a server zone including nodes corresponding to server devices, a medical device zone including nodes corresponding to medical devices, a white zone including registered nodes excluding the server devices and the medical devices, and a gray zone including nodes included in none of the above-mentioned zones, representing links between the nodes, and representing a node and a link in which a security attack is detected using a different color when the security attack is detected in the node.

18 Claims, 10 Drawing Sheets

(56) References Cited

U.S. PATENT DOCUMENTS

| | | | | |
|---|---|---|---|---|
| 2009/0129599 | A1* | 5/2009 | Garcia | H04L 9/083 |
| | | | | 380/279 |
| 2010/0125912 | A1 | 5/2010 | Greenshpon et al. | |
| 2017/0063905 | A1 | 3/2017 | Muddu et al. | |
| 2019/0098028 | A1* | 3/2019 | Ektare | H04L 43/10 |
| 2020/0241711 | A1* | 7/2020 | Pandian | H04L 63/102 |
| 2024/0323207 | A1* | 9/2024 | Lee | H04L 43/00 |

FOREIGN PATENT DOCUMENTS

| | | | |
|---|---|---|---|
| KR | 20180007832 A | | 1/2018 |
| KR | 10-1987031 B1 | | 6/2019 |
| KR | 10-2057459 B1 | | 1/2020 |
| KR | 10-2021-0177523 | * | 12/2021 |
| KR | 10-2408568 B1 | | 6/2022 |
| KR | 10-2438067 B1 | | 8/2022 |

OTHER PUBLICATIONS

Shiravi, Hadi, Ali Shiravi, and Ali A. Ghorbani. "A survey of visualization systems for network security." IEEE Transactions on visualization and computer graphics 18.8: 1313-1329. (Year: 2011).*
Paulo Salvador et al., "DICOM Interception System for Independent Image Backup," IEEE/IFIP Network, Operations and Management Symposium, May 5, 2014.

* cited by examiner

Detected attacks
_index: dashtw_%{twid}_attack_%{detection_type}
. _id: %{saddr}
. . %{tupleid}: (detectiontime="" , confidence, threat_level, severity, subclass, description)}
. _id: %{tupleid}
. . %{saddr}: (detectiontime="" , confidence, threat_level, severity, subclass, description)}

Node info
_index: dashtw_%{twid}_nodes
. _id: %{IP} or %{subnetIP} or "white" or "gray"
. . detected: %{yes or no}
. . detected_tuple_list: %{tupleid},...
. . detection_type_list: %{detection_type}.... zone: "white" or "gray" or "device" or "server"

Link info
_index: dashtw_%{twid}_links
. _id: %{IP} %{IP} or %{subnetIP} %{IP} or %{subnetIP}_%{subnetIP} or "gray" % (IP) or "gray" %{subnetIP} or "white" %{IP} or "white" %{subnet|P}
. . detected: %{yes or no}
. . detected_src_tuple_list %{IP}:%{tupleid}...
. . detection_type_list: %{detection_type}....
. . zone: "white" or "gray" or "device" or "server"

FIG. 6

METHOD AND APPARATUS FOR VISUALIZING MEDICAL DEVICE NETWORK AND SECURITY ATTACK

CROSS REFERENCE TO RELATED APPLICATION

This application claims the benefit of Korean Patent Application No. 10-2022-0175015, filed Dec. 14, 2022, which is hereby incorporated by reference in its entirety into this application.

BACKGROUND OF THE INVENTION

1. Technical Field

The present disclosure relates to a method for visualizing a medical device network and a security threat.

More particularly, the present disclosure relates to technology for arranging nodes in a divided zone depending on the characteristics of the nodes and intuitively showing network threats.

2. Description of the Related Art

Ransomware targeting medical institutions is on the rise. In terms of security of medical institutions, medical devices are particularly important. This is not only because there are threats of data leakage from the medical devices and malfunctions of the medical devices but also because penetration into internal servers in a hospital becomes possible after attacks on the medical devices vulnerable to security threats. Actually, a lot of attacks for penetrating farther into a hospital, such as Electronic Medical Records (EMR) servers and the like, through medical devices, which are relatively vulnerable to security threats, have been a success in the medical institutions.

Typical techniques for responding to ransomware combine various solutions at device and network levels. This is because installing security modules, such as anti-virus software and the like, directly in medical devices is restricted due to availability, which has the highest priority in the medical devices. Therefore, countermeasures against cyber-attacks, such as ransomware, and the like, in the medical device networks of medical institutions use a method of non-invasively monitoring traffic at a network level.

When a threat is detected in network traffic or when abnormal traffic is detected using techniques based on AI or the like, the threat is typically detected for each packet or flow. Here, a network flow is configured with a tuple such as that illustrated below.

(source IP address, source port number, destination IP address, destination port number, protocol)

In the case of Intrusion Prevention Systems (IPS) that provide these functions, dashboards for retrieval and management of detection results are operated along therewith, and visualization functions for graphically representing network threats are also provided. In this case, a structure for connecting a node (an IP node) to another node (another IP node) is provided, and when a detected threat is present, nodes and links related thereto are displayed to be distinguished from the other nodes and links (e.g., by changing color). This facilitates checking the detection results, but has limitations in analysis because the overall network structure or the characteristics of nodes (e.g., data servers, authorized external servers for maintenance, and IP addresses randomly generated during an attack such as ransomware or the like) are not incorporated. When a spreading attack occurs due to infection with ransomware or malware, it is difficult to represent a large number of generated nodes (IP addresses). Also, in the case of a node like a data server accessed by a large number of nodes, it is difficult to visually check whether an attack occurs therein or a change appears due to the characteristics of the server.

The present disclosure presents a method for visualizing a network and detected threats in which characteristics of a network, particularly, a medical device network of a medical institution are incorporated.

Documents of Related Art (Patent Document 1) Korean Patent No. 10-2438067, titled "System for supporting automation and visualization service methods for cloud infrastructure deployment".

SUMMARY OF THE INVENTION

An object of the present disclosure is to provide a method through which a network structure can be intuitively understood by incorporating characteristics of nodes.

Another object of the present disclosure is to early and intuitively detect a security threat by visualizing a medical device network and the security threat.

In order to accomplish the above objects, a method for visualizing a medical device network and a security threat according to an embodiment of the present disclosure includes representing nodes in zones that are divided into a server zone including nodes corresponding to server devices, a medical device zone including nodes corresponding to medical devices, a white zone including registered nodes excluding the server devices and the medical devices, and a gray zone including nodes included in none of the above-mentioned zones, representing links between the nodes, and representing a node and a link in which a security attack is detected using a different color when the security attack is detected in the node.

Here, types of the nodes may include an IP node corresponding to a terminal having an IP address, a subnet node corresponding to each subnet address, a gray node for connecting nodes corresponding to the gray zone, and a white node for connecting nodes corresponding to the white zone.

Here, types of the links may include an IP-node-to-subnet-node type, a subnet-node-to-subnet-node type, a gray-node-to-IP-node type, a white-node-to-IP-node type, a gray-node-to-subnet-node type, a white-node-to-subnet-node type, and an IP-node-to-IP-node type.

Here, a link of the IP-node-to-IP-node type may be generated when a security attack is detected.

Here, a link of the IP-node-to-subnet-node type may represent an IP node belonging to a subnet address corresponding to the subnet node, and a link of the subnet-node-to-subnet-node type may represent that communication information between IP nodes belonging to respective subnet addresses is present.

Here, in the gray zone, a preset number of IP nodes may be represented, and an IP node in which a security attack is detected may be preferentially represented.

Here, representing the node and the link using the different color may include displaying detailed information including the type of the security attack, the subtype thereof, and port information for the link in which the security attack is detected.

Here, representing the node and the link using the different color may include displaying detailed information about the security attack for neighboring nodes around the node in which the security attack is detected.

Here, information about the security attack may be stored in a database structure including a time window, the type of the security attack, and an IP address.

Also, in order to accomplish the above objects, an apparatus for visualizing a medical device network and a security threat according to an embodiment of the present disclosure includes memory in which at least one program is recorded and a processor for executing the program. The program includes instructions for performing representing nodes in zones that are divided into a server zone including nodes corresponding to server devices, a medical device zone including nodes corresponding to medical devices, a white zone including registered nodes excluding the server devices and the medical devices, and a gray zone including nodes included in none of the above-mentioned zones, representing links between the nodes, and representing a node and a link in which a security attack is detected using a different color when the security attack is detected in the node.

Here, types of the nodes may include an IP node corresponding to a terminal having an IP address, a subnet node corresponding to each subnet address, a gray node for connecting nodes corresponding to the gray zone, and a white node for connecting nodes corresponding to the white zone.

Here, types of the links may include an IP-node-to-subnet-node type, a subnet-node-to-subnet-node type, a gray-node-to-IP-node type, a white-node-to-IP-node type, a gray-node-to-subnet-node type, a white-node-to-subnet-node type, and an IP-node-to-IP-node type.

Here, a link of the IP-node-to-IP-node type may be generated when a security attack is detected.

Here, a link of the IP-node-to-subnet-node type may represent an IP node belonging to a subnet address corresponding to the subnet node, and a link of the subnet-node-to-subnet-node type may represent that communication information between IP nodes belonging to respective subnet addresses is present.

Here, in the gray zone, a preset number of IP nodes may be represented, and an IP node in which a security attack is detected may be preferentially represented.

Here, representing the node and the link using the different color may include displaying detailed information including the type of the security attack, the subtype thereof, and port information for the link in which the security attack is detected.

Here, representing the node and the link using the different color may include displaying detailed information about the security attack for neighboring nodes around the node in which the security attack is detected.

Here, information about the security attack may be stored in a database structure including a time window, the type of the security attack, and an IP address.

BRIEF DESCRIPTION OF THE DRAWINGS

The above and other objects, features, and advantages of the present disclosure will be more clearly understood from the following detailed description taken in conjunction with the accompanying drawings, in which:

FIG. 6 is a view illustrating part of a database for visualizing a network and a security threat;

DESCRIPTION OF THE PREFERRED EMBODIMENTS

Figure 1:
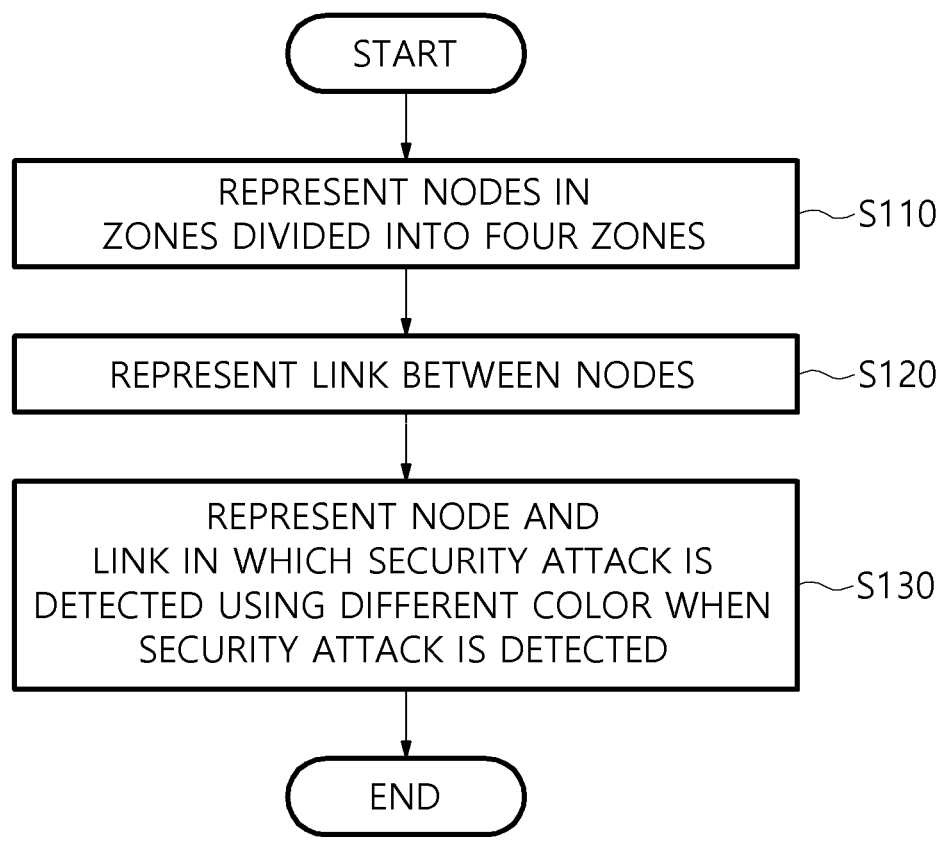
FIG. 1 is a flowchart illustrating a method for visualizing a medical device network and a security threat according to an embodiment of the present disclosure.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

In the present specification, each of expressions such as "A or B", "at least one of A and B", "at least one of A or B", "A, B, or C", "at least one of A, B, and C", and "at least one of A, B, or C" may include any one of the items listed in the expression or all possible combinations thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a flowchart illustrating a method for visualizing a medical device network and a security threat according to an embodiment of the present disclosure.

The method for visualizing a medical device network and a security threat according to an embodiment of the present disclosure may be performed by an apparatus for visualizing a medical device network and a security threat, such as a computing device or a server.

Referring to FIG. 1, the method for visualizing a medical device network and a security threat according to an embodiment of the present disclosure includes representing nodes in zones that are divided into a server zone including nodes corresponding to server devices, a medical device zone including nodes corresponding to medical devices, a white zone including registered nodes excluding the server devices and the medical devices, and a gray zone including nodes included in none of the above-mentioned zones at step S110, representing links between the nodes at step S120, and representing a node and a link in which a security attack is detected using a different color at step S130 when the security attack is detected in the node.

Here, the types of the nodes may include an IP node corresponding to a terminal having an IP address, a subnet node corresponding to each subnet address, a gray node for connecting nodes corresponding to the gray zone, and a white node for connecting nodes corresponding to the white zone.

Here, the types of the link may include an IP-node-to-subnet-node type, a subnet-node-to-subnet-node type, a gray-node-to-IP-node type, a white-node-to-IP-node type, a gray-node-to-subnet-node type, a white-node-to-subnet-node type, and an IP-node-to-IP-node type.

Here, a link of the IP-node-to-IP-node type may be generated when a security attack is detected.

Here, a link of the IP-node-subnet-node type may represent an IP node belonging to a subnet address corresponding to the subnet node, and a link of the subnet-node-to-subnet-node type may represent that communication information between IP nodes belonging to respective subnet addresses is present.

Here, in the gray zone, a preset number of IP nodes may be represented, and an IP node in which a security attack is detected may be preferentially represented.

Here, representing the node and the link using the different color at step S130 may include displaying detailed information, including the type of the security attack, the subtype thereof, and port information, for the link in which the security attack is detected.

Here, representing the node and the link using the different color at step S130 may include displaying detailed information about the security attack for neighboring nodes around the node in which the security attack is detected.

Here, information about the security attack may be stored in a database structure including a time window, the type of the security attack, and an IP address.

Hereinafter, a method for visualizing a medical device network and a security threat according to an embodiment of the present disclosure will be described in more detail with reference to FIGS. 2 to 10.

In the method according to an embodiment of the present disclosure, detection of a network threat is performed in units of source nodes (source IP address) and tuples ({destination IP address, destination port number, protocol}). For example, a security threat detection result may be represented in the following format:

detected node: 123.134.12.120 detected tuple: {140.123.123.122_1900_UDP}

Here, '123.134.12.120' may be the IP (source IP address) of the node in which an attack is detected, '140.123.123.122' may be a destination IP address, '1900' may be a port number, and 'UDP' may be a protocol.

Figure 2:
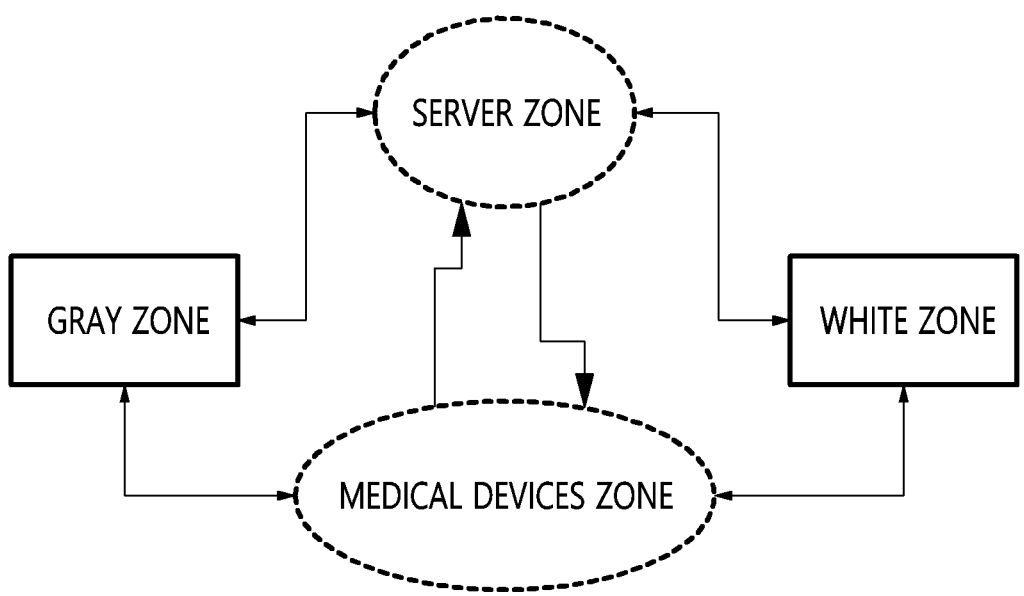
FIG. 2 is an example of the configuration of zones for visualizing a medical device network.

FIG. 2 is an example of the configuration of zones for visualizing a medical device network.

Referring to FIG. 2, nodes may be arranged in any of four zones, and a description of the nodes is as follows. FIG. 2 is illustrated for convenience of description. Here, it indicates that nodes included in the server zone illustrated on the upper center side, nodes included in the white zone illustrated on the right side, nodes included in the gray zone illustrated on the left side, and nodes included in the medical device zone illustrated on the lower center side are schematically arranged, and the scope of the present disclosure is not limited thereto.

Server zone: server devices registered in a hospital (e.g., Electronic Medical Records (EMR) servers, Picture Archiving and Communication System (PACS) servers, data storage servers, and the like)

Medical device zone: medical devices registered in the hospital (e.g., Practice Management Software (PMS), Computerized Tomography (CT) scanners, Magnetic Resonance Imaging (MRI) scanners, and the like)

White zone: authorized external IP addresses registered in the hospital, excluding the devices registered in the server zone or the medical device zone, (e.g., authorized external IP addresses for maintenance and medical services) and other reserved network service IP addresses (e.g., multicast addresses, link-local addresses, and the like)

Gray zone: nodes included in none of the server zone, the medical device zone, and the white zone are arranged in the gray zone.

Typically, it is likely that a destination address to which a connection is attempted in a spreading process as a result of infection with malware/ransomware is arranged in the gray zone.

Information about nodes included in each of the zones is predefined using an IP address list, a subnet class (e.g., the band of 10.10.90 for servers, the band of 10.10.10~10.10.60 for medical devices).

Figure 3:
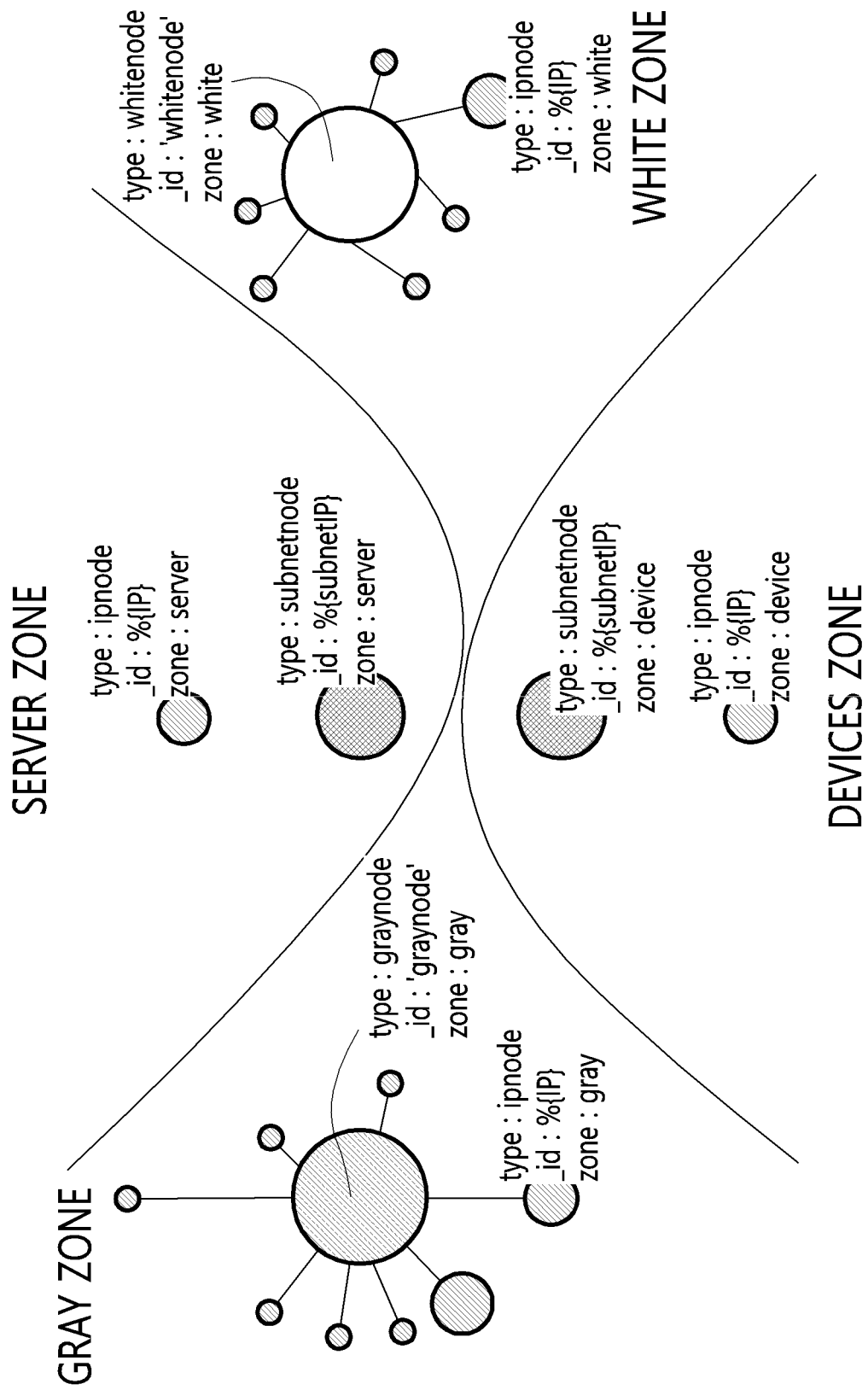
FIG. 3 is an example of the definition of a node type for visualizing a network.

FIG. 3 is an example of the definition of a node type for visualizing a network.

Referring to FIG. 3, 'type' denotes the type of a node, '_id' denotes the ID of the node, and 'zone' denotes the zone to which the node belongs. A total of four node types is present, and a description thereof will be made below. Here, % { } denotes a corresponding value (e.g., % {IP}—>an IP address value (e.g., 129.122.3.4)).

IP node: an IP node indicates a terminal node having an IP address, the type thereof is 'ipnode', the _id thereof is % {IP} (an IP address, e.g., 129.122.3.15), and the zone field thereof has one of the values 'server', 'device', 'white', and 'gray' depending on the zone to which the node belongs.

subnet node: a subnet node indicates a class C subnet address. The type thereof is 'subnetnode', the _id thereof is %{subnetIP} (a class C subnet address, e.g., 129.122.3.x), and the zone thereof has one of the values 'server', 'device', 'white', and 'gray' depending on the zone to which the subnet belongs.

gray node: a gray node is generated at the outset and is a node that is generated in order to connect nodes included in the gray zone. The type thereof is 'graynode', the _id thereof is 'graynode', and the zone thereof is 'gray'.

white node: a white node is generated at the outset and is a node that is generated in order to connect nodes included in the white zone. The type thereof is 'whitenode', the _id thereof is 'whitenode', and the zone thereof is 'white'.

When the above-described nodes are generated, the following rules may be applied.

IP nodes are generated for both the source address and the destination address discovered as a result of traffic monitoring, and zone information corresponding thereto is set according to the rule.

when the zone of the IP node corresponds to 'device' or 'server', a subnet node is generated using a class C subnet address with reference to the IP information of the IP node. When the corresponding subnet node is already present, this process is omitted.

when the zone of the IP node is 'white' or 'gray', a subnet node corresponding thereto is not generated.

Figure 4:
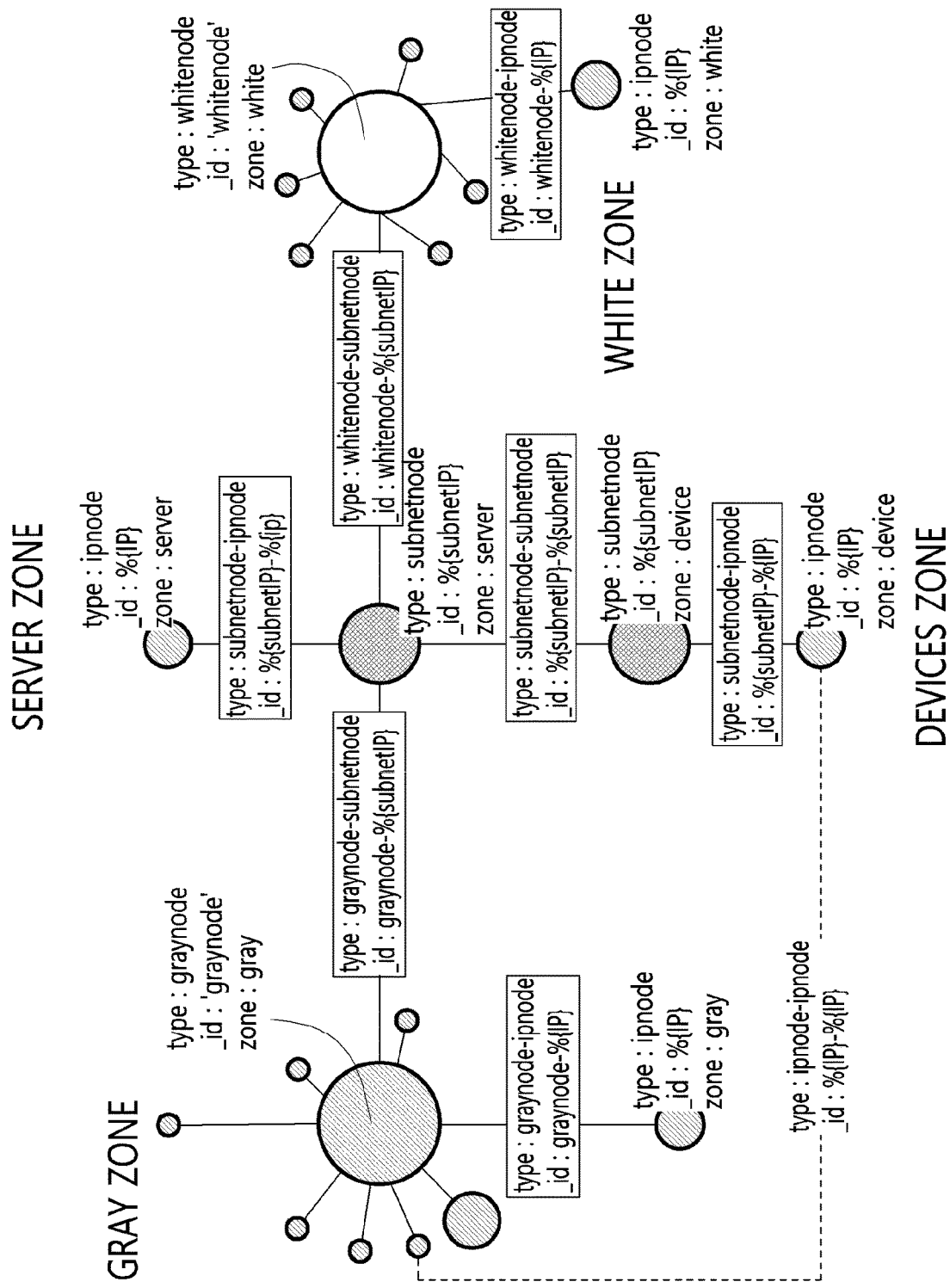
FIG. 4 is an example of the definition of a link type for visualizing a network.

FIG. 4 is an example of the definition of a link type for visualizing a network.

Information about each link type and a rule for generating a link are as follows:

subnetnode-ipnode is a link connecting a subnet with an IP node. When the IP node is generated, if the zone thereof is 'device' or 'server', this link is generated. A link to a class C subnet to which the IP address of the IP node belongs is generated.

subnetnode-subnetnode is a link for connecting a subnet with another subnet. When communication information between an IP node belonging to (connected to) subnet node A and an IP node belonging to (connected to) subnet node B is present, this link is generated (e.g., subnetIP_A-subnetIP_B)

graynode-ipnode is a link for connecting a gray node with each of the IP nodes included in the gray zone. For all of the IP nodes included in the gray zone, graynode-ipnode links are generated.

whitenode-ipnode is a link for connecting a white node to each of the IP nodes included in the white zone. For all of the IP nodes included in the white zone, whitenode-ipnode links are generated.

graynode-subnetnode connects a gray node with a subnet node. When communication information between an IP node belonging to (connected to) a specific subnet node and a node belonging to the gray zone is present, this link is generated.

whitenode-subnetnode connects a white node with a subnet node. When communication information between an IP node belonging to (connected to) a specific subnet node and a node belonging to the white zone is present, this link is generated.

ipnode-ipnode is a link for connecting an IP node with another IP node. This link is generated only when an attack is detected. When an attack is detected, the attack is detected based on a tuple and an IP, and destination IP information (included in the tuple) and source IP information may be extracted. Based on the extracted information, this link is generated. In this case, information related to attack (threat) detection is also stored.

Figure 5:
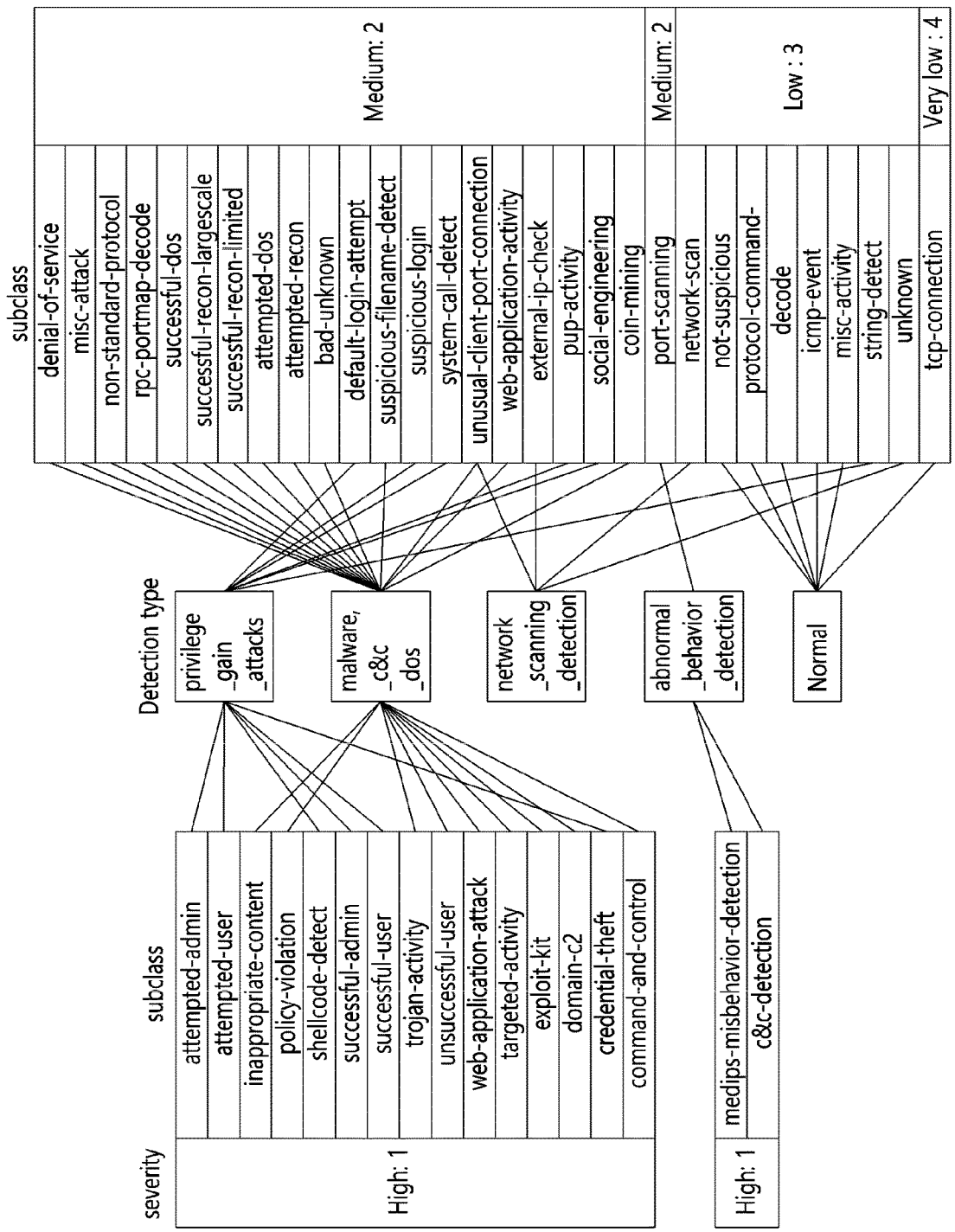
FIG. 5 is an example of classification of cyberattack information.

FIG. 5 is an example of classification of cyberattack information.

Referring to FIG. 5, a total of four detection types is defined, and each of the detection types includes multiple subclasses. Generally, detection is performed in units of subclasses. In the present disclosure, the subclass is mapped to a detection type, and the detection type and the subclass are used for visualization.

In the information illustrated in FIG. 5, a detection type indicates a main category of a detected threat, a subclass indicates a subcategory of the detected threat, and severity indicates the severity (a risk level) of the threat.

FIG. 6 is a view illustrating part of a database for visualizing a network and a security threat.

The database illustrated in FIG. 6 is an Elasticsearch DB and has a conceptualized structure. At the actual visualization step, which will be described later, the database in FIG. 6 may be used. The detailed description of the database structure of FIG. 6 is as follows:

_index is indexed data. It is retrieved by using _id as a key, and a value in the form of key:value may be acquired from a retrieval result. For example, in the case of the first index in FIG. 6, an index is retrieved using twid (a time window ID) and the value of detection_type, information is retrieved using saddr, and a specific tupleid is retrieved from the result, whereby a value may be acquired.

For example, when information is retrieved using 139 (twid), 'privilege gain attack' (detection type), and '129.144.2.2' (saddr), a detailed threat detection result for the threat classified as a privilege gain attack on 129.144.2.2 in the time window of 139 may be retrieved. This is provided together with a detected tuple ID list. When detection information pertaining to a specific tuple ID needs to be retrieved, tuple information (e.g., 130.4.4.1:150:icmp) is additionally retrieved, whereby detailed detection information pertaining to a specific tuple of a specific source IP address may be displayed. The time window is set in advance in a configuration file. The time window may be set in units of hours or days (e.g., an hour, a day, or the like).

'Detected attacks' index indicates detailed information about a detected attack. For twid (a time window) or a detection type (the detection type in FIG. 4), information may be retrieved using saddr (a source IP address) or tupleid (tuple information). When information is retrieved using saddr, detected tuples and detailed information about a detected threat may be acquired. Alternatively, a detected threat may be retrieved using a combination of saddr and a specific tuple. When all attacks, rather than an attack of a specific detection type, are intended to be retrieved, attacks of the total four detection types are respectively retrieved.

'Node info' index indicates information about a node, and _id has a value of %{IP}, %{subnetIP}, 'white', or 'gray'. When information is retrieved using _id, detected (information about whether a threat is detected), detected_tuple_list (a list of detected tuples), detection_type_list (a list of detected detection_type values), and zone information are retrieved.

'Link info' index indicates information about a link. When information is retrieved using a link, detected (information about whether a threat is detected), detected_src_tuple_list (a list of detected source IPs and tuples), detection_type_list (a list of detected detection_type values), and zone information are retrieved.

Figure 7:
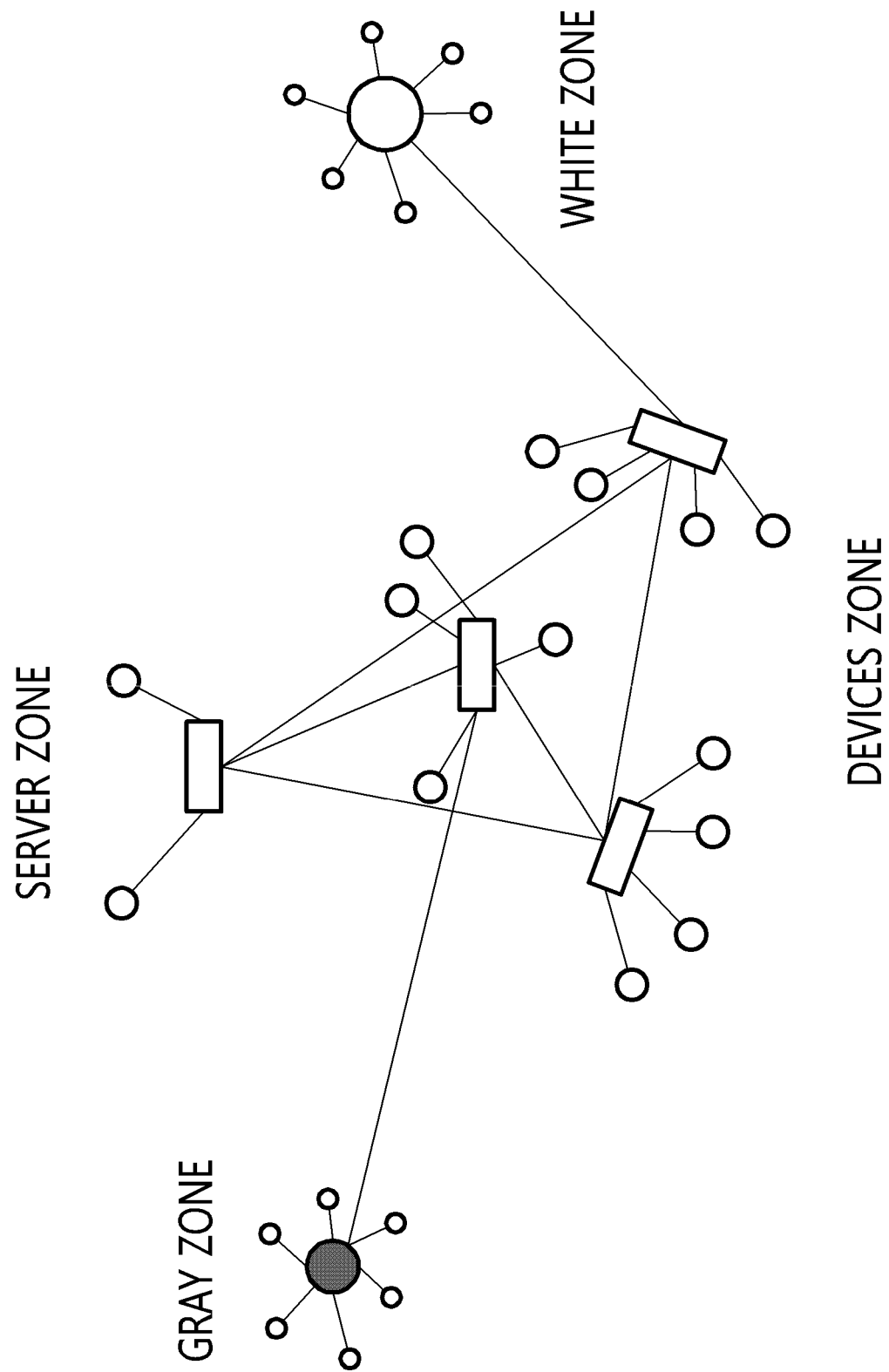
FIG. 7 is an example of visualization of an initial network connection in a method according to an embodiment of the present disclosure.

FIG. 7 is an example of visualization of an initial network connection in a method according to an embodiment of the present disclosure.

Referring to FIG. 7, respective nodes are arranged in corresponding zones, and when no attack is detected, a connection between IP nodes is not represented.

With regard to a gray zone, the maximum number of IP nodes (max_graylink) to be initially represented as being included in the gray zone at the visualization step is preset. Then, at the visualization display step, only a number of IP nodes and gray-node-to-IP-node links (graynode-ipnode type) corresponding to max_graylink are displayed, and the remaining ones are omitted. Here, a node in which an attack is detected is preferentially connected to the gray node. That is, the corresponding node and link are preferentially displayed on the screen.

Figure 8:
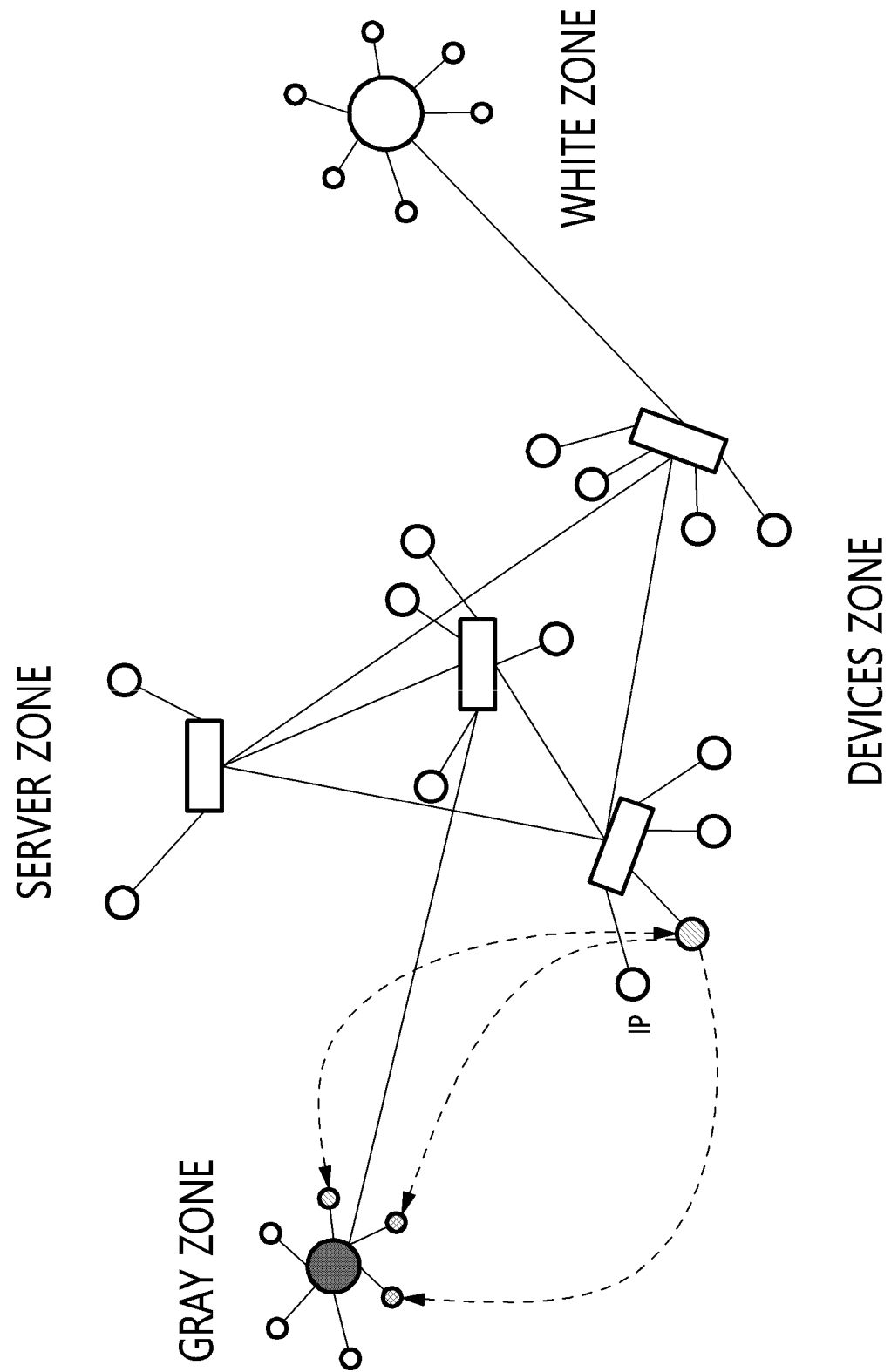
FIG. 8 is an example of visualization when a security attack is detected in a method according to an embodiment of the present disclosure.

FIG. 8 is an example of visualization when a security attack is detected in a method according to an embodiment of the present disclosure.

Referring to FIG. 8, the followings are changed when compared with FIG. 7.

- A detected IP node is marked in red (the node marked with diagonal lines in FIG. 8), and a destination address (a destination IP in a tuple) is marked in yellow (the nodes marked with a grid in FIG. 8).
- A link between the source IP node and the destination IP node of a detected attack is generated and marked in red (the link marked with a dotted line in FIG. 8).
- In the link, the direction of an attack is represented using an arrow, and when attacks occur in both directions (that is, when the nodes at the opposite ends of the link are the detected IP nodes), the link is represented using bidirectional arrows.

Figure 9:
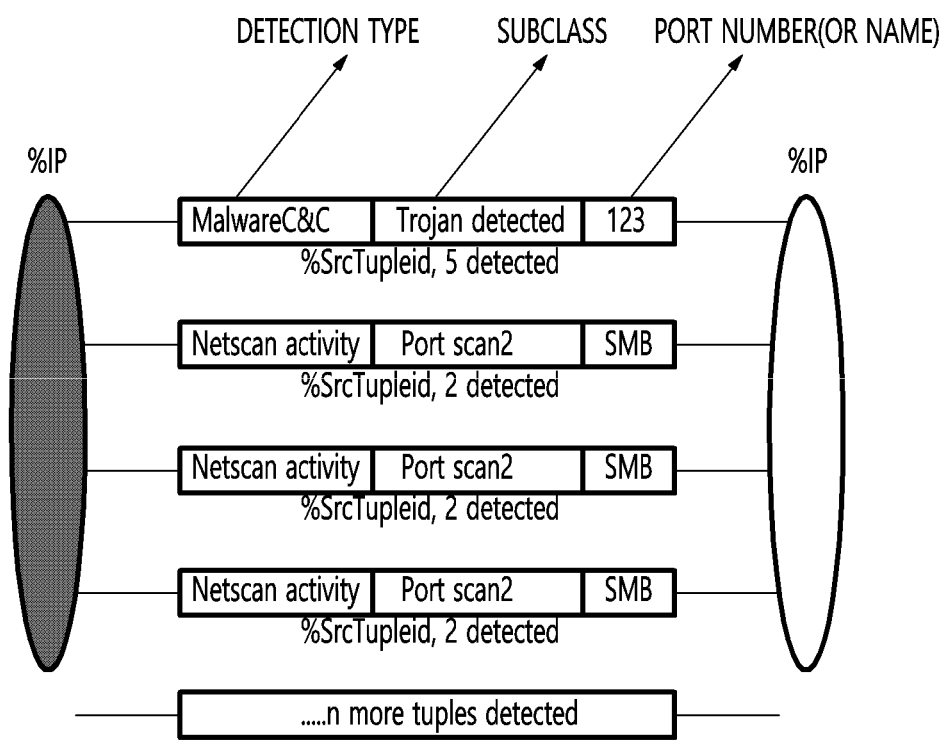
FIG. 9 is an example of detailed visualization of a link in which a security threat is detected.

FIG. 9 is an example of detailed visualization of a link in which a security threat is detected.

When a user selects the retrieval of detailed information about a specific link in FIG. 8, the screen shown in FIG. 9 may be provided. The user may select the retrieval of detailed information using any of various methods, e.g., clicking the link, selecting a detailed information retrieval menu item, or the like.

Referring to FIG. 9, IP nodes are arranged on both sides of the screen, and boxed information, including a detection type, a subclass, and a port number, is displayed for each % srcTupleid detected between the two IP nodes (% {IP}:% {tupleid} in the database illustrated in FIG. 6). Additionally, the number of times the corresponding attack is detected may be displayed below the boxed information (e.g., 5 detected). When multiple source tuple IDs (% srcTupleid) are detected, only a number of source tuple IDs corresponding to the number defined in the configuration is displayed, and the remaining ones may be represented by displaying the text "n more tuples detected" or the like.

Figure 10:
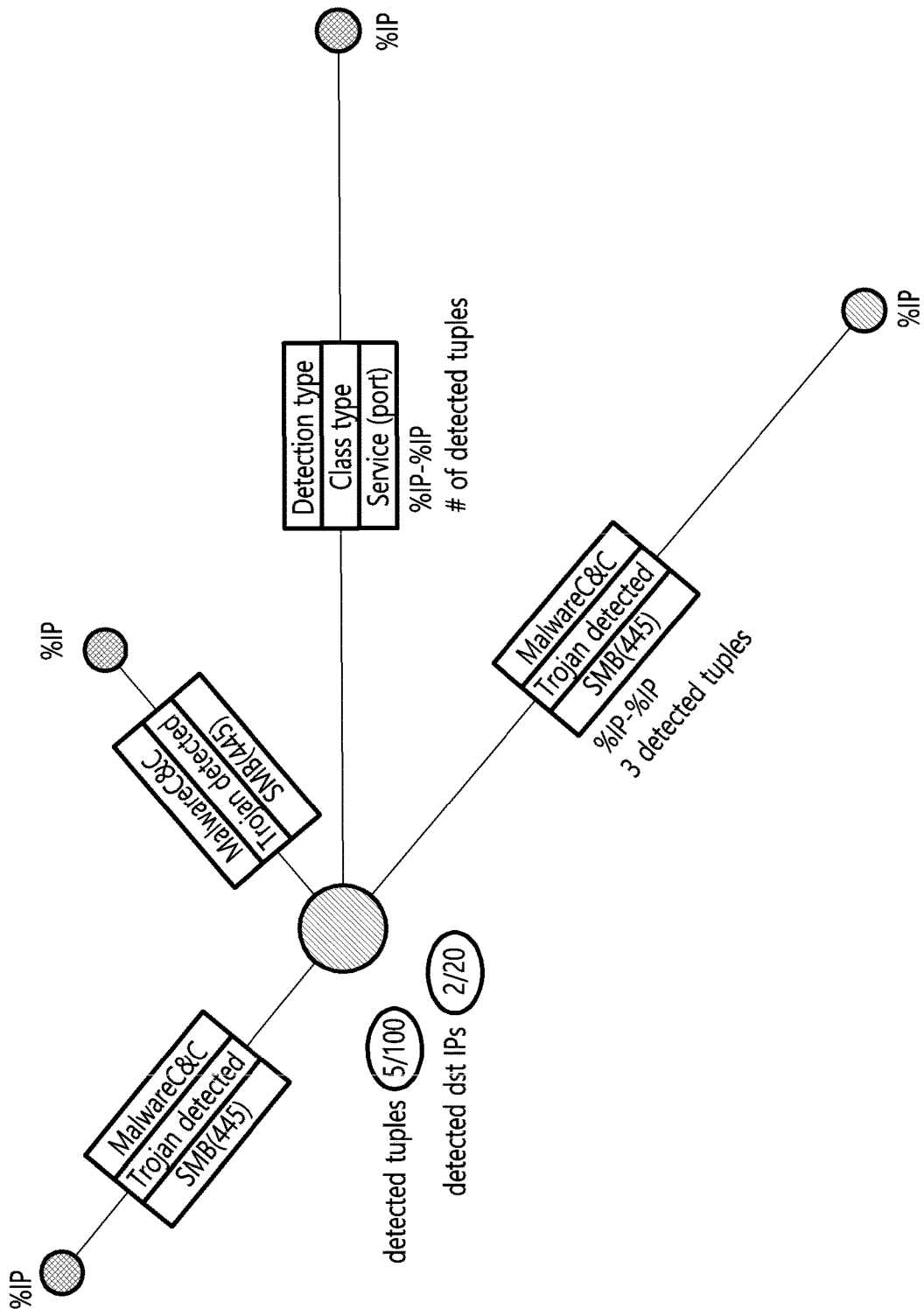
FIG. 10 is an example of detailed visualization of a node in which a security threat is detected.

FIG. 10 is an example of detailed visualization of a node in which a security threat is detected.

When a user selects the retrieval of detailed information about a specific node in FIG. 8, the screen shown in FIG. 10 may be provided. The user may select the retrieval of detailed information using any of various methods, e.g., clicking the link, selecting a detailed information retrieval menu item, or the like.

Referring to FIG. 10, threat information is provided by being displayed around the node selected by the user (the circle placed in the center). Below the node, detected tuple information (e.g., 5/100, which means that five tuples, among 100 tuples related to the corresponding node, are detected as attacks) and detected IP information (e.g., 2/20, which means that two nodes, among twenty nodes communicating with the corresponding node, are detected as being attacked) are displayed.

The detected links and nodes are displayed around the selected node. On each of the links, a box containing {detection type, subclass, port} information pertaining to a representative threat, among the detected threats, is displayed, and the number of tuples detected as a threat in the corresponding link (# of detected tuples) is displayed below the box. Here, detailed information about the detection result may be provided in the form of text.

Figure 11:
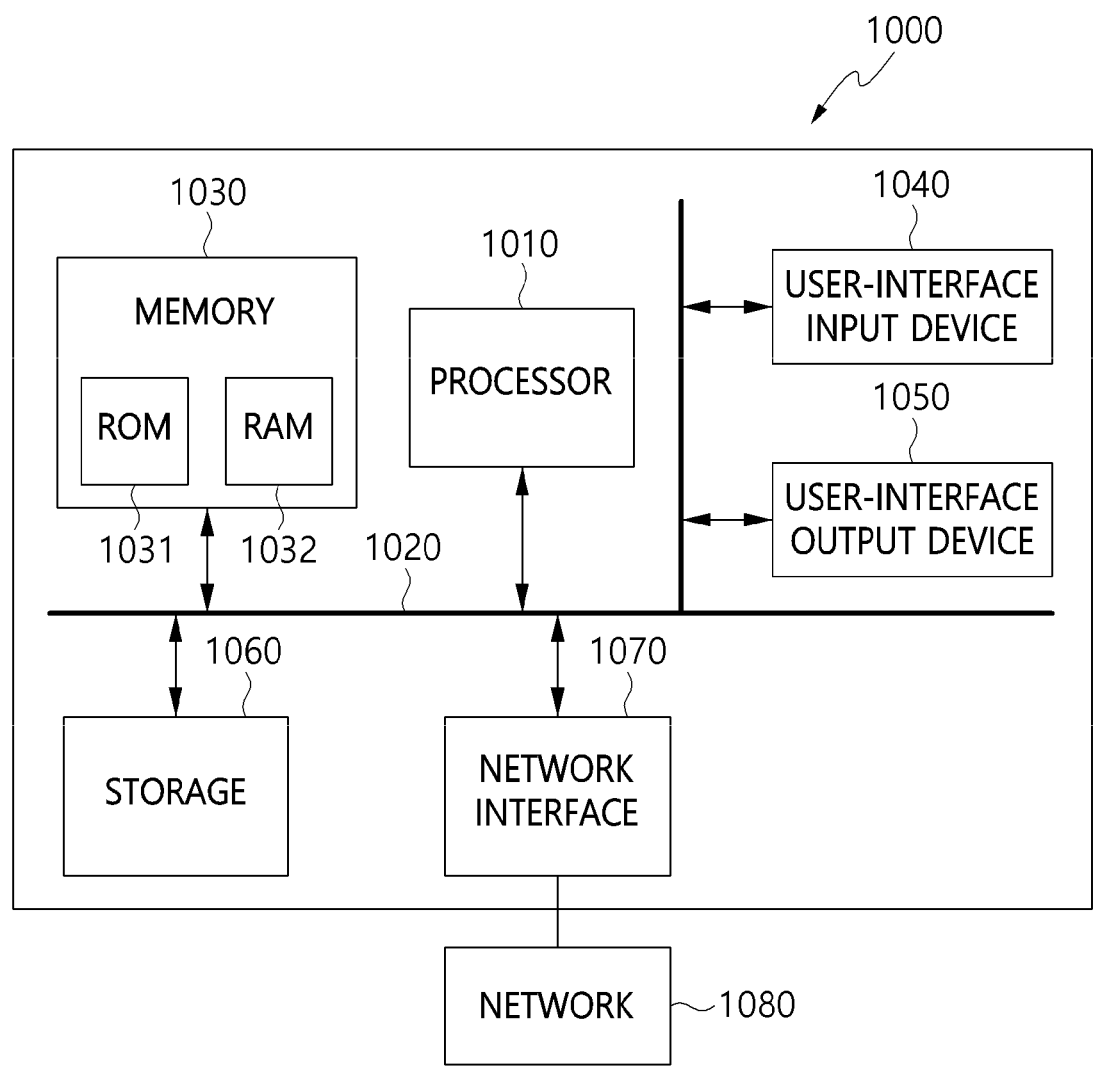
FIG. 11 is a view illustrating the configuration of a computer system according to an embodiment.

FIG. 11 is a view illustrating the configuration of a computer system according to an embodiment.

The apparatus for visualizing a medical device network and a security threat according to an embodiment may be implemented in a computer system 100 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

The apparatus for visualizing a medical device network and a security threat according to an embodiment of the present disclosure includes memory 1030 in which at least one program is recorded and a processor 1010 for executing the program, and the program includes instructions for performing a step of representing nodes in zones that are divided into a server zone including nodes corresponding to server devices, a medical device zone including nodes corresponding to medical devices, a white zone including registered nodes excluding the server devices and the medical devices, and a gray zone including nodes included in none of the above-mentioned zones, a step of representing links between the nodes, and a step of representing a node and a link in which a security attack is detected using a different color when the security attack is detected in the node.

Here, the types of the nodes may include an IP node corresponding to a terminal having an IP address, a subnet node corresponding to each subnet address, a gray node for connecting nodes corresponding to the gray zone, and a white node for connecting nodes corresponding to the white zone.

Here, the types of the links may include an IP-node-to-subnet-node type, a subnet-node-to-subnet-node type, a gray-node-to-IP-node type, a white-node-to-IP-node type, a gray-node-to-subnet-node type, a white-node-to-subnet-node type, and an IP-node-to-IP-node type.

Here, a link of the IP-node-to-IP-node type may be generated when a security attack is detected.

Here, a link of the IP-node-to-subnet-node type may represent an IP node belonging to a subnet address corresponding to the subnet node, and a link of the subnet-node-to-subnet-node type may represent that communication information between IP nodes belonging to respective subnet addresses is present.

Here, in the gray zone, a preset number of IP nodes are represented, and an IP node in which a security attack is detected may be preferentially represented.

Here, representing the node and the link using the different color may include displaying detailed information including the type of the security attack, a subtype thereof, and port information for the link in which the security attack is detected.

Here, representing the node and the link using the different color may include displaying detailed information about the security attack for neighboring nodes around the node in which the security attack is detected.

Here, information about the security attack may be stored in a database structure including a time window, the type of the security attack, and an IP address.

According to the present disclosure, there may be provided a method through which a network structure can be intuitively understood by incorporating characteristics of nodes.

Also, the present disclosure may early and intuitively detect a security threat by visualizing a medical device network and the security threat.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for visualizing a medical device network and a security threat, comprising:
   representing nodes in zones that are divided into a server zone including nodes corresponding to server devices, a medical device zone including nodes corresponding to medical devices, a white zone including registered nodes excluding the server devices and the medical devices, and a gray zone including nodes included in none of the server zone, the medical device zone, and the white zone;
   representing links between the nodes; and
   representing a node and a link in which a security attack is detected using a different color when the security attack is detected in the node.

2. The method of claim 1, wherein types of the nodes include an IP node corresponding to a terminal having an IP address, a subnet node corresponding to each subnet address, a gray node for connecting nodes corresponding to the gray zone, and a white node for connecting nodes corresponding to the white zone.

3. The method of claim 2, wherein types of the links include an IP-node-to-subnet-node type, a subnet-node-to-subnet-node type, a gray-node-to-IP-node type, a white-node-to-IP-node type, a gray-node-to-subnet-node type, a white-node-to-subnet-node type, and an IP-node-to-IP-node type.

4. The method of claim 3, wherein a link of the IP-node-to-IP-node type is generated when a security attack is detected.

5. The method of claim 3, wherein:
   a link of the IP-node-to-subnet-node type represents an IP node belonging to a subnet address corresponding to the subnet node, and
   a link of the subnet-node-to-subnet-node type represents that communication information between IP nodes belonging to respective subnet addresses is present.

6. The method of claim 3, wherein, in the gray zone, a preset number of IP nodes is represented, and an IP node in which a security attack is detected is preferentially represented.

7. The method of claim 3, wherein representing the node and the link using the different color includes displaying detailed information, including a type of the security attack, a subtype thereof, and port information, for the link in which the security attack is detected.

8. The method of claim 3, wherein representing the node and the link using the different color includes displaying detailed information about the security attack for neighboring nodes around the node in which the security attack is detected.

9. The method of claim 5, wherein information about the security attack is stored in a database structure including a time window, a type of the security attack, and an IP address.

10. An apparatus for visualizing a medical device network and a security threat, comprising:
    memory in which at least one program is recorded; and
    a processor for executing the program,
    wherein the program includes instructions for performing
    representing nodes in zones that are divided into a server zone including nodes corresponding to server devices, a medical device zone including nodes corresponding to medical devices, a white zone including registered nodes excluding the server devices and the medical devices, and a gray zone including nodes included in none of the server zone, the medical device zone, and the white zone,
    representing links between the nodes, and
    representing a node and a link in which a security attack is detected using a different color when the security attack is detected in the node.

11. The apparatus of claim 10, wherein types of the nodes include an IP node corresponding to a terminal having an IP address, a subnet node corresponding to each subnet address, a gray node for connecting nodes corresponding to the gray zone, and a white node for connecting nodes corresponding to the white zone.

12. The apparatus of claim 11, wherein types of the links include an IP-node-to-subnet-node type, a subnet-node-to-subnet-node type, a gray-node-to-IP-node type, a white-node-to-IP-node type, a gray-node-to-subnet-node type, a white-node-to-subnet-node type, and an IP-node-to-IP-node type.

13. The apparatus of claim 12, wherein a link of the IP-node-to-IP-node type is generated when a security attack is detected.

14. The apparatus of claim 12, wherein:
a link of the IP-node-to-subnet-node type represents an IP node belonging to a subnet address corresponding to the subnet node, and
a link of the subnet-node-to-subnet-node type represents that communication information between IP nodes belonging to respective subnet addresses is present.

15. The apparatus of claim 12, wherein, in the gray zone, a preset number of IP nodes is represented, and an IP node in which a security attack is detected is preferentially represented.

16. The apparatus of claim 12, wherein representing the node and the link using the different color includes displaying detailed information, including a type of the security attack, a subtype thereof, and port information, for the link in which the security attack is detected.

17. The apparatus of claim 12, wherein representing the node and the link using the different color includes displaying detailed information about the security attack for neighboring nodes around the node in which the security attack is detected.

18. The apparatus of claim 14, wherein information about the security attack is stored in a database structure including a time window, a type of the security attack, and an IP address.

* * * * *